United States Patent [19]

Berg

[11] Patent Number: 5,121,987

[45] Date of Patent: * Jun. 16, 1992

[54] METHOD AND APPARATUS FOR MEASURING COEFFICIENT OF THERMAL EXPANSION

[75] Inventor: Ralph T. Berg, Ramsey, Minn.

[73] Assignee: Honeywell Inc., Minneapolis, Minn.

[*] Notice: The portion of the term of this patent subsequent to Feb. 5, 2008 has been disclaimed.

[21] Appl. No.: 600,642

[22] Filed: Oct. 19, 1990

Related U.S. Application Data

[63] Continuation of Ser. No. 318,076, Mar. 2, 1989, Pat. No. 4,989,980.

[51] Int. Cl.$^5$ ............... G01B 11/02; G01N 25/16
[52] U.S. Cl. .................................. 356/357; 374/55; 356/356
[58] Field of Search ............ 374/55, 56, 45; 356/357, 358, 356

[56] References Cited

U.S. PATENT DOCUMENTS

| | | | |
|---|---|---|---|
| 3,899,253 | 8/1975 | Overhoff | 356/108 |
| 3,913,141 | 10/1975 | Collins et al. | 356/110 |
| 3,930,730 | 1/1976 | Laurens et al. | 374/130 |
| 3,952,150 | 4/1976 | Gerardin et al. | 178/6.8 |
| 3,953,129 | 4/1976 | Hildebrand | 356/109 |
| 3,997,266 | 12/1976 | Hildebrand | 356/109 |
| 4,499,373 | 2/1985 | Johnston | 250/231 P |
| 4,541,717 | 9/1985 | Itamoto | 356/359 |
| 4,591,996 | 5/1986 | Vachon | 356/360 |
| 4,606,638 | 8/1986 | Sommargren | 356/358 |
| 4,641,971 | 2/1987 | Korth | 356/357 |
| 4,729,654 | 3/1988 | Akuta et al. | 356/358 |

FOREIGN PATENT DOCUMENTS

| | | | |
|---|---|---|---|
| 94041 | 11/1983 | European Pat. Off. | 356/358 |
| 0227554 | 7/1987 | European Pat. Off. | 356/358 |
| 2348272 | 4/1974 | Fed. Rep. of Germany | 356/357 |
| 2263340 | 6/1974 | Fed. Rep. of Germany | 356/358 |
| 0255060 | 3/1988 | Fed. Rep. of Germany | 374/55 |
| 2231952 | 12/1974 | France | 356/358 |
| 894350 | 12/1981 | U.S.S.R. | 356/358 |
| 993011 | 1/1983 | U.S.S.R. | 356/358 |
| 367859 | 2/1932 | United Kingdom | 356/358 |

OTHER PUBLICATIONS

Bennett, S. J., "An absolute interferometric dilatometer," J. Phys. E., Sci. Instrum (GB), vol. 10, No. 5 (May 1977).

Merritt, G. E., "The Interference Method of Measuring Thermal Expansion," Research Paper No. 515, Bureau of Standards Journal of Research, vol. 10 (Jan. 1933).

Saunders, J. B., "Parallel Testing Interferometer," J. of Research of the National Bureau of Standards, vol. 61, No. 6, pp. 491-498 (Dec. 1958).

Tanner, L. H. "The Measurement of Viscosity by Optical Techniques Applied to a Falling Liquid Film", (Jun. 1976).

Kishii, T. et al., "A Focused-Beam Type Laser Interferometric Dilatometer," Proc. ICO Conf. Opt. Methods in Sci. and Ind. Meas. Tokyo (1974).

Sargent, J. P., et al., "Interferometric Measurement of Thermal Expansion," Applied Optics, vol. 17, No. 5 (Mar. 1, 1978).

*Primary Examiner*—William A. Cuchlinski, Jr.
*Assistant Examiner*—Diego F. F. Gutierrez
*Attorney, Agent, or Firm*—Robert A. Pajak

[57] ABSTRACT

A method and apparatus for optically measuring coefficient of thermal expansion includes an optical dilatometer system. The system provides a housing having a chamber defined therein and a transparent end adapted for receiving a focused laser beam into the chamber. The housing is adapted for maintaining a vacuum in the chamber. The optical dilatometer system further provides an interferometer comprising first and second interference surfaces, the interferometer being positioned within the chamber. The system further provides a test sample positioned between the first and second interference surfaces. The method includes the step of transmitting a focused laser beam through the transparent end and to the interferometer, thereby generating an interference pattern defined by Newton rings. The Newton ring interference pattern is utilized to determine the coefficient of thermal expansion of the test sample.

19 Claims, 3 Drawing Sheets

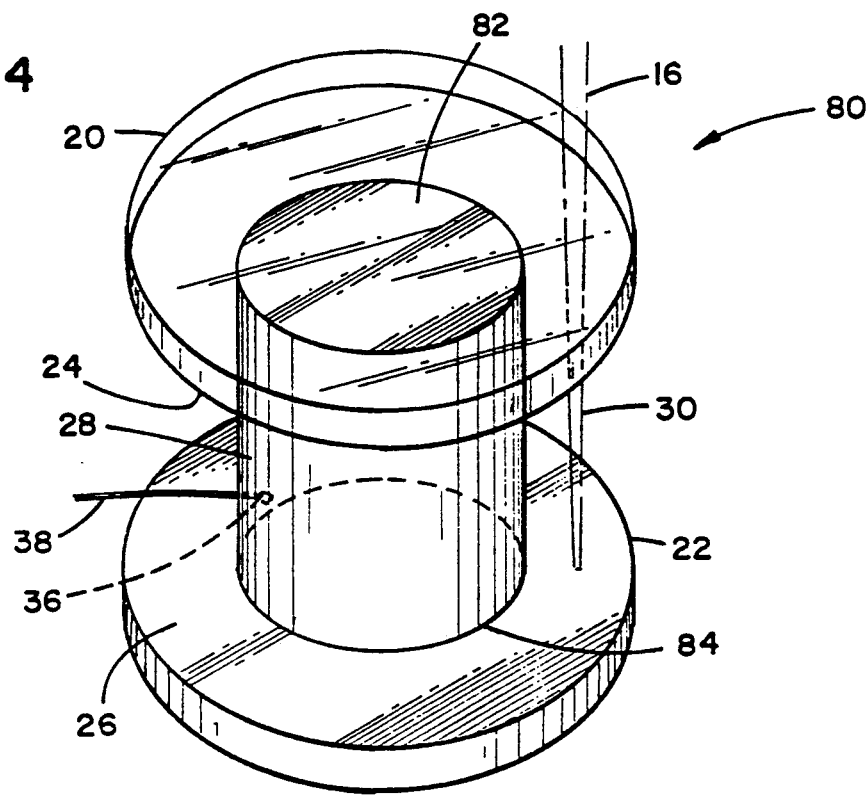
FIG. 4
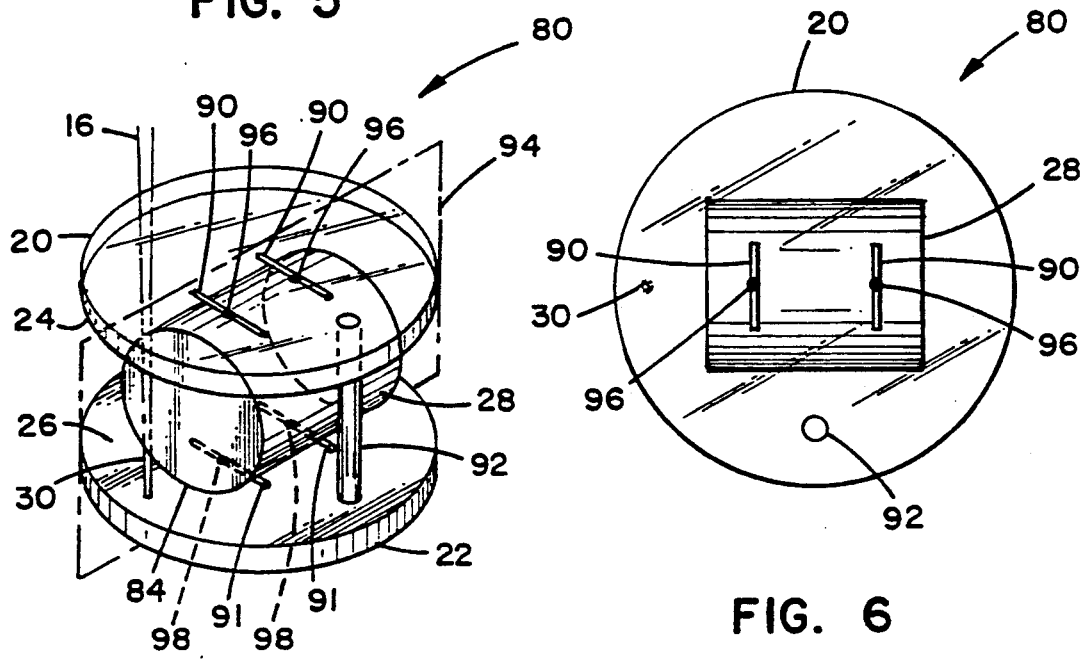
FIG. 5
FIG. 6

METHOD AND APPARATUS FOR MEASURING COEFFICIENT OF THERMAL EXPANSION

FIELD OF THE INVENTION

This is a continuation of patent application, having Ser. No. 07/ 318,076, filed on Mar. 2, 1989, now U.S. Pat. No. 4,989,980, entitled "Method and Apparatus for Measuring Coefficient of Thermal Expansion".

The present invention relates to a method and apparatus for optically measuring the coefficient of thermal expansion "CTE") for a selected material. More specifically, the apparatus of the present invention relates to an optical dilatometer which employs a Fizeau interferometer in combination with a focused laser beam to generate an interference pattern defined by Newton rings. The diameter and area of the Newton rings depends on the expansion or contraction of a test sample which is positioned between the Fizeau interferometer's interference surfaces. The method of the present invention relates to the use of area measurements of the Newton rings to derive CTE.

BACKGROUND OF THE INVENTION

The field of dilatometry has had a long and unfilled need for a cost efficient dilatometer system capable of providing more accurate CTE measurements. Concerning the more specific field of optical dilatometry, the prior art's emphasis on the use of interferometers that employ collimated or parallel light beams ("parallel light interferometers") has resulted in few advancements in cost efficiency and measurement accuracy.

Parallel light interferometers generate a linear interference pattern, and as used in a dilatometer system, the bright and dark linear fringes of the interference pattern travel across a viewing screen as the temperature of the test sample is varied. To derive CTE, the linear displacement of the fringes with respect to a reference mark on the viewing screen must be measured. Because a reference mark of the viewing screen is used, accuracy of the CTE measurements depends of the stability of the interferometer and the test sample with respect to the reference mark on the viewing screen. To develop a system with maximum stability can be very costly. It would be desirable to develop a system which would not require the use of a reference mark on the viewing screen.

In addition to the stability problems in the prior art, the measurement of linear displacement to derive CTE inherently limits the system's sensitivity and accuracy. For example, it would be desirable to measure a squared function such as area to derive the linear measurements needed to measure CTE, thus substantially increasing accuracy.

Furthermore, in order to maintain accurate fringe detection when using parallel light interferometers, it is also very important to develop a system which maintains parallel light beams. This can be very difficult when the system employs more than one beam splitter or mirror. To maintain parallel light beams requires that the mirrors and beam splitters be aligned within very strict tolerances. To manufacture a system within such tolerances can be very difficult and costly.

The present invention avoids the use of parallel light beam interferometers to resolve the problems described above.

The dilatometry field has also had a long and unfilled need for a system capable of measuring CTE for items of manufacture, e.g., a system capable of measuring CTE of the end product rather than CTE of the material from which it is made. To accomplish this objective requires a system adaptable to annular or circular surfaces so that radial as well as linear CTE can be measured. The apparatus and method of the present invention is capable of measuring both linear and radial CTE and is adaptable to annular as well as flat surfaces.

Accordingly, the present invention provides an optical dilatometer which does not require the use of a reference mark, thereby eliminating the system stability problems discussed above; it permits the measurement of a squared function such as area to determine CTE; it does not require the strict alignment of optical components for maintaining parallel light beams; it is capable of measuring CTE for test samples having either flat or annular surfaces; and it is capable of measuring linear or radial CTE.

SUMMARY OF THE INVENTION

An apparatus according to the present invention comprises a housing having a chamber defined therein and a transparent end adapted for receiving a focused laser beam into the chamber, the housing comprising structure for maintaining a vacuum in the chamber; measurement structure comprising first and second interference surfaces which define an optical path, the first and second interference surfaces being positioned within the chamber; and a test sample positioned between the first and second interference surfaces, the test sample including structure for facilitating an optical path between the first and second interference surfaces having an optical path length which includes a test sample's length for which expansion or contraction is to be measured.

A test kit compatible with the present invention for use in measuring linear or radial CTE of a material comprises a test sample made of the material, the test sample having first and second extremities defined by the test sample's length across which expansion or contraction is to be measured; interferometer support structure adapted for supporting first and second interference surfaces, the interferometer support structure for supporting the first and second interference surfaces defining first and second planes which are substantially parallel to each other; and structure for facilitating an optical path between the first and second interference surfaces having an optical path length which includes the test sample's length.

A method according to the present invention for measuring coefficient of thermal expansion of a material includes the steps of providing a test assembly including, (i) a housing having a chamber defined therein and having a transparent end, the housing comprising structure for maintaining a vacuum within the chamber; (ii) measurement structure having first and second interference surfaces, the first and second interference surfaces being positioned within the chamber; (iii) a test sample of the material to be measured for CTE situated between the first and second interference surfaces, the test sample comprising structure for facilitating an optical path between the first and second interference surfaces having an optical path length which includes the test sample's length for which expansion or contraction is to be measured; transmitting a focused laser beam through the transparent end and along the optical path, thereby generating an interference pattern defined by Newton's rings; utilizing the Newton ring interference pattern to determine CTE of the material.

BRIEF DESCRIPTION OF THE DRAWINGS

FIG. 4 is a perspective of another embodiment of a test kit used in measuring CTE.

FIG. 5 is another embodiment of a test kit used to measure radial CTE.

FIG. 6 is a top view of the test sample shown in FIG. 5.

DETAILED DESCRIPTION OF THE PREFERRED EMBODIMENT(S)

Figure 1:
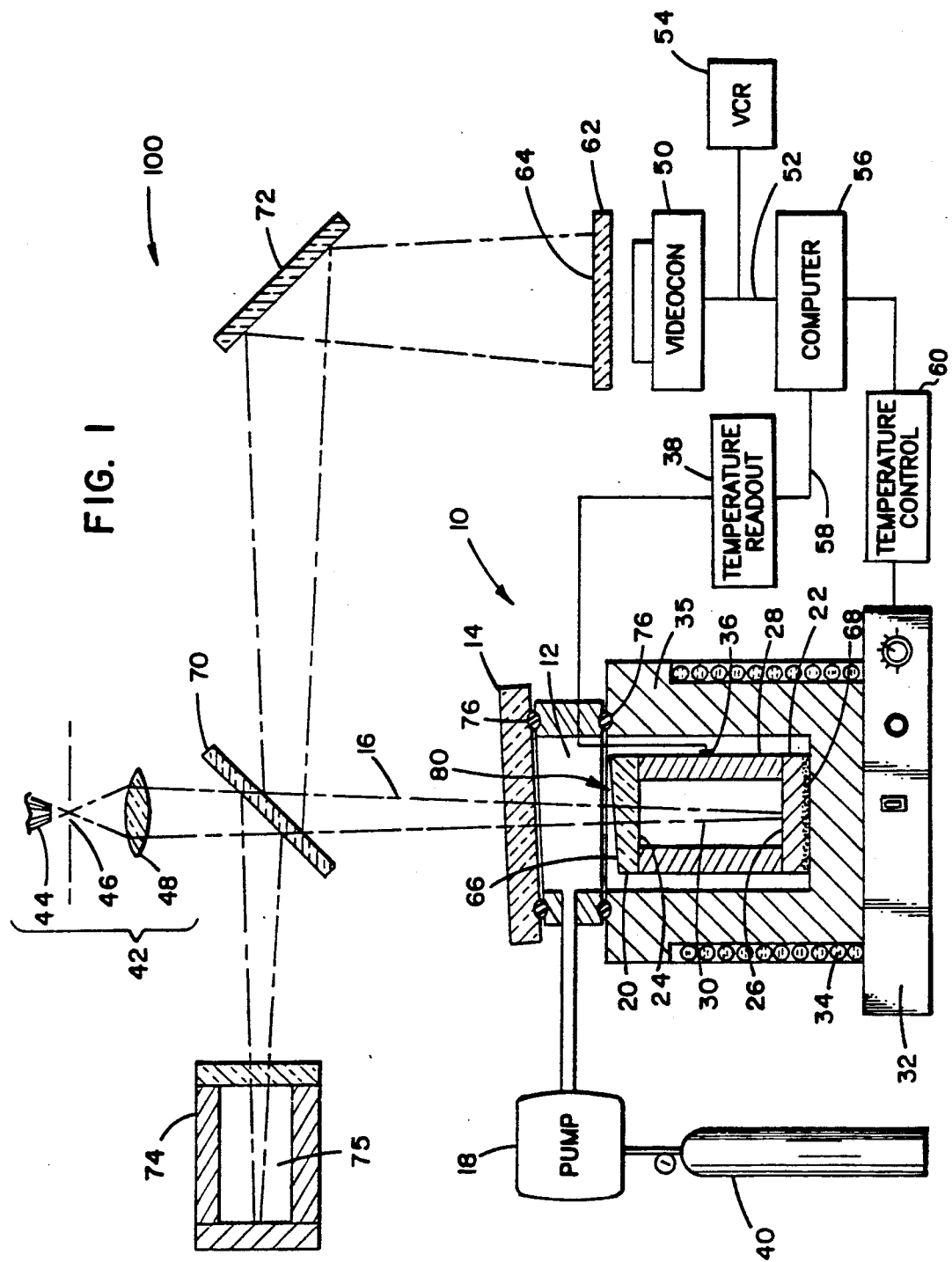
FIG. 1 illustrates an apparatus constructed according to a preferred embodiment of the present invention.
Figure 2:
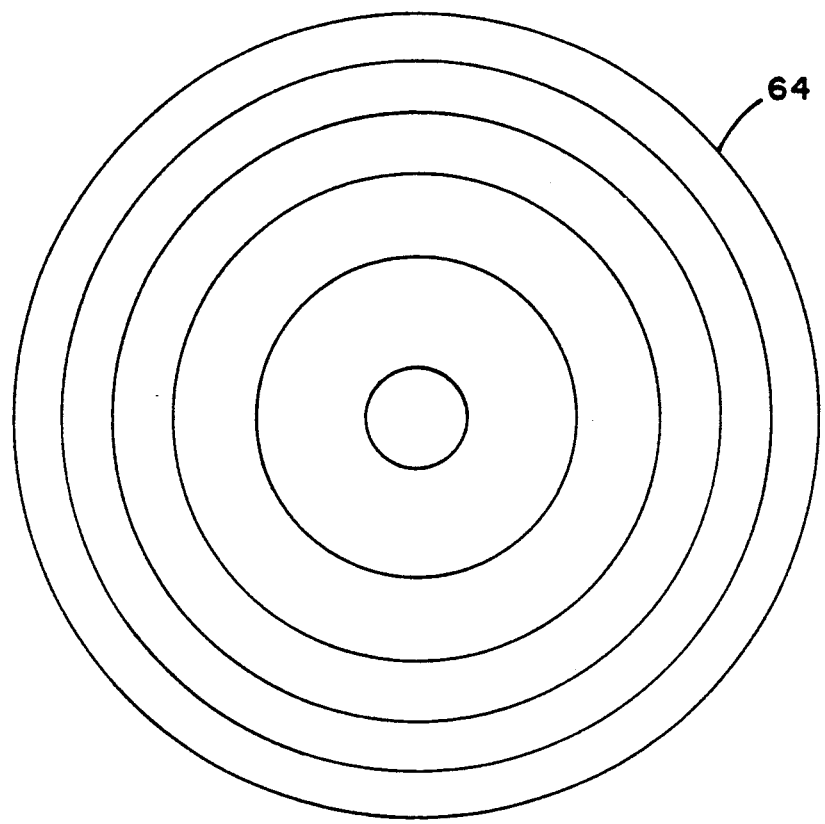
FIG. 2 is a plan view of an interference pattern defined by Newton rings.

FIG. 1 shows a preferred embodiment of an optical dilatometer system 100 which employs a Fizeau interferometer in combination with a focused laser beam 16 to generate an interference pattern defined by Newton rings 64, illustrated in FIG. 2. The optical dilatometer system 100 includes a housing 10 having a chamber 12 defined therein. Housing 10 includes a transparent end 14 which is adapted for receiving a focused laser beam 16 into the chamber 12. Housing 10 further includes o-ring seals 76 which provide an airtight seal so that pump 18 can maintain a vacuum within the chamber 12. In the preferred embodiment, pump 18 should be capable of maintaining a vacuum below one millimeter of Hg.

Referring again to FIG. 1, housing 10 further includes means for varying temperature within the chamber 12. Although it should be understood that a variety of structural arrangements could be used to provide temperature control, according to the preferred embodiment shown here the structure for varying temperature includes, in combination, a heat source 32, liquid nitrogen coils 34 and a substantial mass, e.g., 30 pounds of copper 35, which acts as a heat reservoir. The optical dilatometer system 100 further provides a helium source 40 so that helium can be introduced into the chamber 12 between CTE data measurements (e.g., Newton ring area measurements as described in more detail below). The helium enhances thermoconductivity within the chamber and thereby expedites a temperature change in preparation for making measurements. Once the desired temperature change is obtained, the helium is then pumped out of the chamber 12, returning to a vacuum state within the chamber 12.

Referring again to FIG. 1, the optical dilatometer system 100 further includes an interferometer and a test kit 80, including test sample 28, positioned within the chamber 12 of the housing 10. FIGS. 3 through 6 show alternative embodiments and further detail of the test kit 80, including test sample 28.

The interferometer measurement structure comprising first and second interference surfaces 24, 26. Test sample 28 is positioned between the first and second interference surfaces 24, 26. In the preferred embodiment, the interferometer is a Fizeau interferometer which comprises first and second plates 20, 22. The surfaces of the first and second plates 20, 22 adjacent the test sample 28 comprise the first and second interference surfaces 24, 26. The first and second interference surfaces 24, 26 preferable have a flatness within one-twentieth wavelength of the laser beam light; e.g., for a helium neon laser the wavelength equals 6328 angstroms. Also, according tot he preferred embodiment, the surfaces of the transparent end 14 should have a flatness within one-quarter of the laser beam light.

In the preferred embodiment, it would be helpful if reflections from surfaces other than the first and second interference surfaces 24, 26 could be reflected so as not to interfere with the interference pattern generated by the first and second interference surfaces 24, 26. To help accomplish this result, the optical dilatometer system 100 provides: (1) a transparent end 14 that is slightly tilted, e.g., not parallel with the first and second interference surfaces 24 and 26, so that reflections from the transparent end surfaces do not interfere with the Newton ring interference pattern; (2) a non-interfering surface 66 of the first plate 20 that is slightly angled with respect to the first interference surface 24 so that reflections from the non-interfering surface 66 do not interfere with the Newton ring interference pattern; and (3) a non-interfering surface 68 of the second plate 22 that is nonreflective e.g., a sand blasted or ground surface The optical dilatometer system 100 may be used at high temperatures, for example, 1000 degrees Fahrenheit. In such a case, the transparent end 14 and the first and second plates 20, 22 should be made of a material having a relatively high melting point, such as ceramicized glass or quartz The focused laser beam 16, when applied to the test sample and interferometer arrangement, generates an interference pattern defined by Newton's rings 64, as best shown in FIG. 2. Accordingly, the optical dilatometer system 100 includes a focused laser beam system 42 which includes a laser 44, an aperture 36 having an aperture width, and a lens 48 having a focal length. The focal length should be substantially greater, e.g., at least two orders of magnitude, than the aperture width Preferable, the focal length should be at least a 100 times greater than the aperture width, e.g., commonly referred to as having a F-number greater than a 100.

Referring again to FIG. 1, as shown, the optical dilatometer system 100 permits all the interferomic sensing to be performed at the test sample 28 within the chamber 12 and all the readout to be performed outside the chamber 12 at room temperature. The temperature readout 38 and the Newton ring interference pattern 64 as viewed on viewing screen 62 provide the necessary information to calculate CTE for the test sample 28. The manner in which the Newton ring interference pattern 64 and temperature measurements may be used to derive CTE is discussed in more detail below In the preferred embodiment, the optical dilatometer system 100 provides structure for automating the method for deriving CTE. As shown in FIG. 1, such structure can include a videocon 50 for converting Newton ring video information into cartesian coordinate digital information, and a computer 56 for receiving cartesian coordinate digital information 52 from the videocon 50. The computer 56 also receives temperature data 58 from the chamber 12 and, more specifically, from temperature readout 38. The computer 56 nay be programmed for computing CTE of the material according to one of the methods described below.

As shown in FIG. 1, the automation structure can further include a VCR 54 for recording the change in area of the Newton rings over a temperature range and a temperature control 60 so that the computer 56 can be programmed to control the temperature range over which the area of the Newton ring information will be measured.

Referring again to FIG. 1, beam splitter 70 and folding mirrors 72 are provided to direct the interference pattern 64 to a viewing screen 62. Obviously, other arrangements could be used, e.g., folding mirror 72 could be eliminated.

Referring again to FIG. 1, stability monitor 74 is provided so that the stability of the laser can be monitored, e.g., to ensure that the laser emits a constant wavelength and to ensure dimensional stability of the laser. Note that the need for the stability monitor 74 could be substantially eliminated by providing a stabilized laser source. As shown, the stability monitor 74 can be configured as another test sample 28 and interferometer arrangement as used in the chamber 12. Preferably, the material used to construct the stability monitor has a low CTE and high dimensional stability. Chamber 75 within the stability monitor 74 is preferably maintained in a vacuum, e.g., the stability monitor has an air tight seal.

Figure 3:
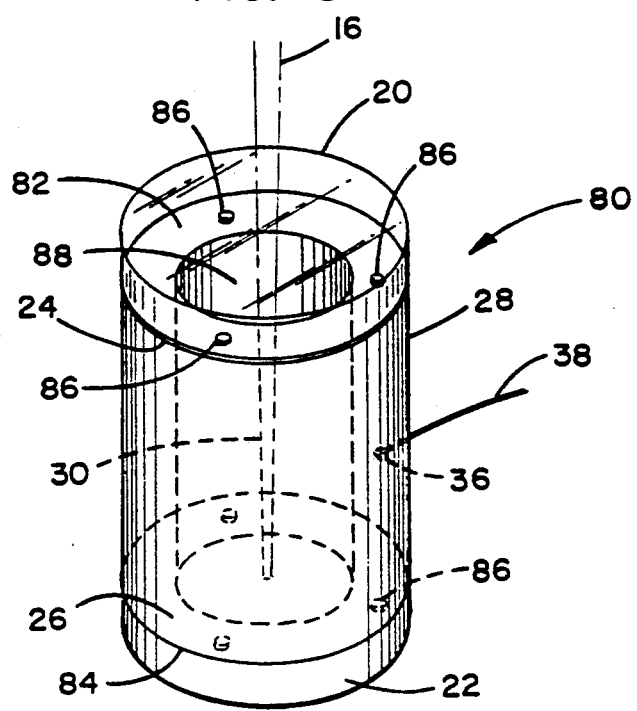
FIG. 3 is a perspective view of one embodiment of a test kit used in measuring CTE.

FIGS. 3, 4, and 5 show alternative embodiments of test kits 80, which include a test sample 28 used in the optical dilatometer system 100. Referring more specifically to FIG. 3, the test kit 80 includes a cylindrical test sample 28 having first and second extremities 82, 84 which define the test sample's length across which expansion or contraction is to be measured. The test sample 80 further includes support structure for supporting the first and second interference surfaces 24, 26. The support structure can be three bosses 86 coupled to each of the first and second extremities 82, 84. Preferably, the three bosses 86 comprise extensions of the test material, e.g., the support structure or bosses 86 can be constructed from the same material as the test sample 28. The support structure or bosses 86 comprise contact portions defining two substantially parallel planes. Preferably, the support structure defines two planes which are parallel within at least 30 arc-seconds.

In one embodiment of the test kit 80, as shown in FIG. 4, the first and second extremities 82, 84 of the test sample 28 comprise the support structure, e.g., the extremity surfaces define the two planes which are parallel within at least 30 arc-seconds. In such an arrangement, the extremity surfaces directly support the first and second interference surfaces 24, 26. The contact between the first and second extremities and the first and second interference surfaces 24, 26 can comprise an optical contact.

The test kit 80 is arranged and constructed so that an optical path 30 can be defined between the first and second interference surfaces 24, 26 wherein the optical path's length includes the test sample's length for which expansion or contraction is to be measured. Preferably, the optical path's length is substantially equal to the test sample's length for which contraction or expansion is to be measured. In FIG. 3, the test sample 28 has an aperture extending there through which facilitates the optical path 30. In FIG. 4, the test sample 28 has a smaller diameter than the first and second plates 20, 22 so that the optical path 30 can be defined adjacent to the test sample 28.

In the preferred embodiment, the test sample 28 of the test kit 80 further includes means for receiving thermal couple or heat sensor 36 which provides temperature readout 38.

As discussed in the background of the invention section above, the dilatometry field has had a long and unfilled need for a system of measuring CTE for items of manufacture, e.g., a system capable of measuring CTE of the material as embodied in the end product. To accomplish this objective requires a system adaptable to annular as well as circular surfaces so that radial as well as linear CTE can be measured. FIGS. 5 and 6 show an example of a test kit 80 adapted for measuring radial CTE. As shown in FIG. 5, the test sample is annular shaped. The first and second extremities 82, 84 comprise first and second diametrically opposed annular extremities. The dimension for which expansion or contraction is to be measured is the annular shaped test sample's diameter.

Referring again to FIGS. 5 and 6, the support structure for test kit 80 includes (1) a first pair of spacers 90 adapted for pivotally engaging the first annular extremity 82 of the test sample 28 at a first pair of contact points 96; (2) a second pair of spacers 92 for pivotally engaging the second annular extremity of the test sample 28 at a second pair of contact points 98; and (3) a support beam for providing another point of contact and support between the first and second interference surfaces 24, 26. The first and second pair of spacers 90, 91 can comprise first and second pairs of shim stock material The first and second pair of contact points 96, 98 define a plane 94. The support beam 92 defines a line parallel to and outside of plane 94. The first and second pair of spacers 90 and 91 in combination with support beam 92 provides means for facilitating the optical path 30, whereby the optical path 30 can be defined anywhere adjacent to the test sample 28 and within the plane 94 defined by the first and second pair of contact points 96, 98.

Preferably, the support structure shown in FIGS. 3, 5, and 6 is made of a material having a CTE substantially equal to the test sample's CTE. Note that any rotation caused by expansion or contraction of support beam 92 shown in FIG. 5 does not change the length of the optical path 30 and thus should not affect the CTE data measurements. However, to reduce the chance of error, preferable beam 92 is also made of material having a CTE substantially equal to the test sample's CTE.

The method according to the present invention, which preferable employs the optical interferometer system 100 shown in FIG. 1, comprises the steps of (1) transmitting a focused laser beam 16 through transparent end 14 along the optical path 30, thereby generating an interference pattern defined by Newton's rings 64; and (2) utilizing the Newton ring interference pattern 64 to determine CTE of the test sample 28. Preferably, the focused laser beam's focal point falls below the first and second interference surfaces 24, 26. Also, the preferred method further includes the step of introducing helium into the chamber 12 between CTE data measurements (e.g., Newton ring area measurements and test sample temperature measurements) to enhance thermal conductivity within the chamber and thereby expedite a temperature change before making such CTE data measurements. After the desired temperature is obtained, the helium is pumped out, thus returning the chamber 12 to the vacuum state for CTE measurements.

One method of utilizing the Newton ring interference pattern 64 to derive CTE of the test sample 28 comprises the following steps: (1) taking a first area measurement (A1) of a predetermined Newton ring at a first temperature (T1); (2) varying the temperature of the test sample 28; (3) taking a second area measurement (A2) of a predetermined Newton ring at a second temperature (T2); and (4) calculating the CTE of the test sample using the first and second area measurements, A1 and A2, taken at the first and second temperatures, T1 and T2, respectively.

In this method, the first and second area measurements, A1 and A2, preferably are determined by applying Simpson's rule or the Best Fit Circle method, two known integrating methods for determining area of irregular closed locuses. In the preferred embodiment shown in FIG. 1, the computer 56 can be programmed to apply Simpson's rule or the Best Fit Circle method to the cartesian coordinate digital information 52 received from videocon 50.

It would be desirable to calculate an average CTE to reduce the margin for error, and thus, preferably, a plurality of first and second area measurements for a plurality of corresponding Newton rings, e.g., for all visible Newton rings, are taken so that an average CTE can be calculated.

The step of varying the test sample's temperature can comprise the steps of (1) introducing helium into the chamber 12 to enhance thermoconductivity within the chamber and thereby expedite a temperature change; (2) applying a temperature gradient to the chamber 12, thereby varying the test sample's temperature; and (3) evacuating the helium from the chamber 12, thereby returning to a vacuum state within the chamber 12.

The CTE calculating step in the method described above can comprise the steps of: (1) calculating area difference (A1 − A2) for the predetermined Newton ring over a corresponding temperature difference (T2 − T1); (2) converting the area difference to a test sample length difference by multiplying by a scale factor; and (3) calculating CTE defined by the equation:

$$CTE = \frac{\text{length difference}}{(\text{length})(T2 - T1)}.$$

The term "(length)" in the denominator of the above equation is the length of the sample, and the CTE is expressed in units of length per unit of temperature per unit of sample length. In the preferred embodiment, the test sample 28 has a unity length, e.g., a length equal to the unit of measure being used so that CTE can be approximately defined by the equation:

$$CTE = \frac{\text{length difference}}{T2 - T1}.$$

Referring now to the scale factor used to convert the area difference to a test sample length difference, in a Newton ring interference pattern as shown in FIG. 2, the difference between any two adjacent Newton rings is a constant. This constant is proportional to the wavelength of the laser beam, or more specifically, to the wave length divided by two. The scale factor thus is defined by the equation $$\text{Scale Factor} = \frac{\frac{1}{2}\text{ wavelength}}{\text{Area Difference Between Adjacent Rings}}$$

wherein wavelength in this equation is the wavelength associated with the laser beam To enhance the accuracy of the calculated scale factor, preferably a plurality of measurements of area differences between adjacent Newton rings are taken These area measurements are then averaged to improve accuracy of the scale factor.

An alternative method of utilizing the Newton ring interference pattern to determine CTE of test sample 28 comprises the steps of: (1) selecting a reference area determined by an area measurement of a predetermined Newton ring taken at a first temperature measurement (T1); (2) varying the test sample's temperature; (3) taking a second temperature measurement (T2) when a Newton ring adjacent to the predetermined Newton ring has an area equal to the reference area, thus indicating that the test samples corresponding length change or difference is one-half of the wavelength of the laser beam; and (4) calculating CTE using the first and second temperature measurements in the corresponding length change.

These steps can be repeated over a temperature range so that an average CTE value can be calculated. Again, by providing a test sample having a unity length, CTE can be approximately defined by the equation:

$$CTE = \frac{\text{length change}}{T2 - T1}.$$

For the methods described above, the videocon 50 and computer 56 can be programmed to perform the method steps.

It is to be understood that, even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An apparatus for measuring changes in the dimensions of a material comprising:
    means for generating an interference pattern defined by Newton rings which are a function of said material;
    ring measuring means for determining the area of at least one of said Newton rings; and
    second means for determining the magnitude of changes in dimension of said material as a function of changes in the area of at least one of said Newton rings.

2. The apparatus of claim 1 wherein said dimension is changed by changing the temperature of said material.

3. The apparatus of claim 2, wherein said second means is adapted to calculate the coefficient of thermal expansion of said material from said dimension changes.

4. The apparatus of claim 1 wherein said means for generating an interference pattern comprises an interferometer means for transmitting a focused laser beam along an optical path defined between first and second interference surfaces and includes means for generating an interference pattern defined by Newton rings which are a function of said optical path.

5. The apparatus of claim 4, which further includes scale factor means for determining a scale factor as a function of the difference between the area of a pair of successive Newton rings and the wavelength value of said laser beam.

6. The apparatus of claim 4, which further includes fixture means for positioning said material between said first and second surfaces, said optical path having an optical path length which is a function of the dimensions of said material.

7. The apparatus of claim 6, which further includes scale factor means for determining a scale factor as a function of the difference between the area of a pair of successive Newton rings and the wavelength value of said laser beam.

8. The apparatus according to claim 1 wherein the interferometer means includes
   (a) vidoecon means for making and converting Newton ring video information into cartesian coordinate digital information; and
   (b) computer means for receiving cartesian coordinate digital information from said videocon means, and for computing the changes in dimension of said material 9. The apparatus according to claim 8 wherein said computer means includes means for receiving temperature data from the material, and for computing the coefficient of thermal expansion of said material.

10. An apparatus for measuring changes in the dimensions of a material comprising
    interferometer means for transmitting a focused laser beam along an optical path defined between first and second interference surfaces, and including means for generating an interference pattern defined by Newton rings which are a function of said optical path;
    ring measuring means for determining the area of selected ones of said Newton rings; and
    second means for determining the magnitude of changes in dimension of said material as a function of changes in the area of at least one of said Newton rings.

11. A method for measuring changes in the dimensions of a material, comprising the steps of
    generating an interference pattern defined by Newton rings which are a function of said material;
    determining the area of at least one of said Newton rings; and
    determining the magnitude of changes in dimension of said material as a function of changes in the area of at least one of said Newton rings.

12. The method of claim 11 wherein said dimension is changed by changing the temperature of said material 13. The method of claim 12, including the stop of calculating the coefficient of thermal expansion of said material from said dimension changes 14. The method of claim 11 wherein said interference pattern is generated by transmitting a focused laser beam along an optical path defined between first and second interference surfaces and generating an interference pattern defined by Newton rings which are a function of said optical path.

15. The method of claim 14, which further includes determining a scale factor as a function of the difference between the area of a pair of successive Newton rings and the wavelength value of said laser beam.

16. The method of claim 14, which further includes positioning said material between said first and second surfaces, said optical path having an optical path length which is a function of the dimensions of said material.

17. The method of claim 16, which further includes determining a scale factor as a function of the difference between the area of a pair of successive Newton rings and the wavelength value of said laser beam 18. The method according to claim 11 which includes:
    (a) making and converting Newton ring video information into cartesian coordinate digital information; and
    (b) receiving cartesian coordinate digital information and computing the changes in dimension of said material 19. The method according to claim 18 including receiving temperature data from the material, and computing the coefficient of thermal expansion of said material

* * * * *